United States Patent
Pearson

(10) Patent No.: US 8,483,381 B2
(45) Date of Patent: Jul. 9, 2013

(54) METHODS AND APPARATUS TO PROVIDE CONTACT MANAGEMENT WITH DIRECTORY ASSISTANCE

(75) Inventor: Larry B. Pearson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1070 days.

(21) Appl. No.: 11/553,781

(22) Filed: Oct. 27, 2006

(65) Prior Publication Data
US 2008/0101581 A1    May 1, 2008

(51) Int. Cl.
*H04M 3/42* (2006.01)
*H04M 15/00* (2006.01)

(52) U.S. Cl.
USPC ............. 379/218.01; 379/114.05; 379/121.05

(58) Field of Classification Search
USPC ............. 379/218.01, 201.02, 220.01, 265.01, 379/114, 121.04, 126, 265, 266, 218, 121, 379/122, 123, 124, 125, 218.02; 704/260; 455/428, 422.1, 412.1; 370/352, 353, 354, 370/355, 356, 357
See application file for complete search history.

(56) References Cited

U.S. PATENT DOCUMENTS

| | | | |
|---|---|---|---|
| 5,259,026 A | 11/1993 | Johnson | |
| 5,892,820 A | 4/1999 | Armstrong et al. | |
| 6,163,596 A | 12/2000 | Gelfer et al. | |
| 6,870,915 B2 | 3/2005 | Stillman et al. | |
| 6,870,921 B1 * | 3/2005 | Elsey et al. | 379/218.01 |
| 2003/0076939 A1 * | 4/2003 | Timmins | 379/114.05 |
| 2003/0105635 A1 * | 6/2003 | Graumann | 704/260 |
| 2003/0112937 A1 * | 6/2003 | Kreckel et al. | 379/126 |
| 2003/0179864 A1 | 9/2003 | Stillman et al. | |
| 2003/0179866 A1 | 9/2003 | Stillman | |
| 2004/0029567 A1 * | 2/2004 | Timmins et al. | 455/412.1 |
| 2004/0141604 A1 * | 7/2004 | Shaffer et al. | 379/201.02 |
| 2004/0170260 A1 * | 9/2004 | Baker | 379/114.01 |
| 2004/0170261 A1 * | 9/2004 | Baker | 379/114.01 |
| 2004/0184593 A1 * | 9/2004 | Elsey et al. | 379/218.01 |
| 2004/0258234 A1 | 12/2004 | Stillman et al. | |
| 2005/0041794 A1 * | 2/2005 | Cox et al. | 379/218.02 |
| 2005/0143064 A1 * | 6/2005 | Pines et al. | 455/428 |

(Continued)

FOREIGN PATENT DOCUMENTS
WO    WO 2005/076588    8/2005

OTHER PUBLICATIONS
International Preliminary Report on Patentability corresponding to International Application No. PCT/US2007/076760, mailed May 7, 2009, issued Apr. 28, 2009, 8 pages.

(Continued)

*Primary Examiner* — Fan Tsang
*Assistant Examiner* — Kharye Pope
(74) *Attorney, Agent, or Firm* — Hanley, Flight & Zimmerman, LLC

(57) ABSTRACT

Methods and an apparatus for providing contact management with directory assistance. An example method obtains a directory assistance service record associated with a user, wherein the directory assistance service record includes at least a first data object associated with a directory listing and a second data object associated with the user; queries a first directory with the first data object to obtain listing information associated with the directory listing; and stores the obtained listing information in a second directory as one or more contact records associated with the second data object.

31 Claims, 6 Drawing Sheets

U.S. PATENT DOCUMENTS

| | | | |
|---|---|---|---|
| 2005/0157858 A1 | 7/2005 | Rajagopalan et al. | |
| 2005/0185786 A1* | 8/2005 | Marwell et al. | 379/218.01 |
| 2005/0238159 A1* | 10/2005 | Halsell | 379/218.01 |
| 2006/0072734 A1* | 4/2006 | Baumeister et al. | 379/218.01 |
| 2006/0245576 A1* | 11/2006 | Henry | 379/265.01 |
| 2007/0088616 A1* | 4/2007 | Lambert et al. | 705/26 |
| 2007/0127648 A1* | 6/2007 | Wardin et al. | 379/114.03 |

OTHER PUBLICATIONS

International Search Report corresponding to International Application No. PCT/US2007/076760, mailed Jan. 14, 2008, 5 pages.

Written Opinion corresponding to International Application No. PCT/US2007/076760, mailed Jan. 14, 2008, 7 pages.

* cited by examiner

| | 402 | 404 | 406 | 408 | 410 | 412 | 414 |
|---|---|---|---|---|---|---|---|
| 400 | FIRST NAME | LAST NAME | MAILING ADDRESS | CITY | STATE | ZIP CODE | PHONE NUMBER |
| 420 | JOHN | DOE | 123 FIRST ST | FRANKLIN | TX | 77856 | 979-555-1000 |
| 422 | JANE | DOE | 123 SECOND ST | CLINTON | CA | 95642 | 209-555-1000 |
| 424 | JACK | DOE | 123 THIRD ST | GREENVILLE | ME | 04441 | 207-555-1000 |

FIG. 4

| | 512 | 513 |
|---|---|---|
| 500 | USER NAME | |
| 502 | | ACCOUNT IDENTIFIER | PASSWORD |
| 504 | USER110 | 555-555-1000 | USER110PASSWORD |

| | 514 | 516 | 518 | 520 | 522 | 524 | 526 | 528 |
|---|---|---|---|---|---|---|---|---|
| 511 | CONTACT | FIRST NAME | LAST NAME | MAILING ADDRESS | CITY | STATE | ZIP CODE | PHONE NUMBER |
| 506 | USER110A | JEAN | DOE | 123 FOURTH ST | MADISON | FL | 32340 | 850-555-1000 |
| 508 | USER110B | | | | | | | |

FIG. 5

METHODS AND APPARATUS TO PROVIDE CONTACT MANAGEMENT WITH DIRECTORY ASSISTANCE

TECHNICAL FIELD

This disclosure relates generally to contact management and, more particularly, to methods and apparatus for providing contact management with directory assistance.

BACKGROUND

When using communications systems, individual users are generally interconnected via user devices that are associated with a unique identifier to enable communication among multiple nodes within the communication systems. For example, in a telecommunication system, the identifier is commonly referred to as a "telephone number," which is dialed or inputted with an originating user device to reach a user device (e.g., a telephone) at a particular network termination point associated with the identifier. Given the enormous number of user devices and users within communications systems, each user may desire to retain these identifiers in an accessible medium, such as an electronic address book. Electronic address books may be networked to allow accessibility from a plurality of user devices or transferred to store in local memory of a user device. Electronic address books are commonly formatted in a data structure relating one or more records with varying information, such as addresses, names, etc.

Directory assistance services are commonly used in communication systems to provide listing information to communication systems users. Generally, directory assistance services use a directory or a database containing names, addresses, and telephone numbers for respective users. For example, in the North American public switched telephone network, a user desiring particular listing information dials a directory assistance access code, for example "411," and connects with a directory assistance service. The user generally provides listing information such as a name (e.g., business name, surname, etc.) and/or locality information (e.g., zip codes, state names, cities, etc.) associated with a desired listing record. If the directory assistance service matches the listing information to a particular listing record, a human operator or a recorded message file communicates additional listing information (e.g., a telephone number) associated with the particular listing record to the user. However, to use the requested telephone number in the future, the user must memorize the listing information, manually record the listing information, or call back to the directory assistance service.

After the directory assistance service communicates the additional listing information to the user, the directory assistance service creates a billing feed to charge a particular user for the service. This billing feed may include a phone number or any other unique account identifier for the user and the phone number provided for the matched listing. Generally, this billing feed is sent to a customer records information system ("CRIS"), which bills and records the directory service usage.

BRIEF DESCRIPTION OF THE DRAWINGS

FIG. 4 illustrates an example directory data structure, which may be stored in the directory server(s) of FIG. 1.

FIG. 5 illustrates a contact directory data structure, which may be stored in the contact directory of FIG. 1.

DETAILED DESCRIPTION

Figure 1:
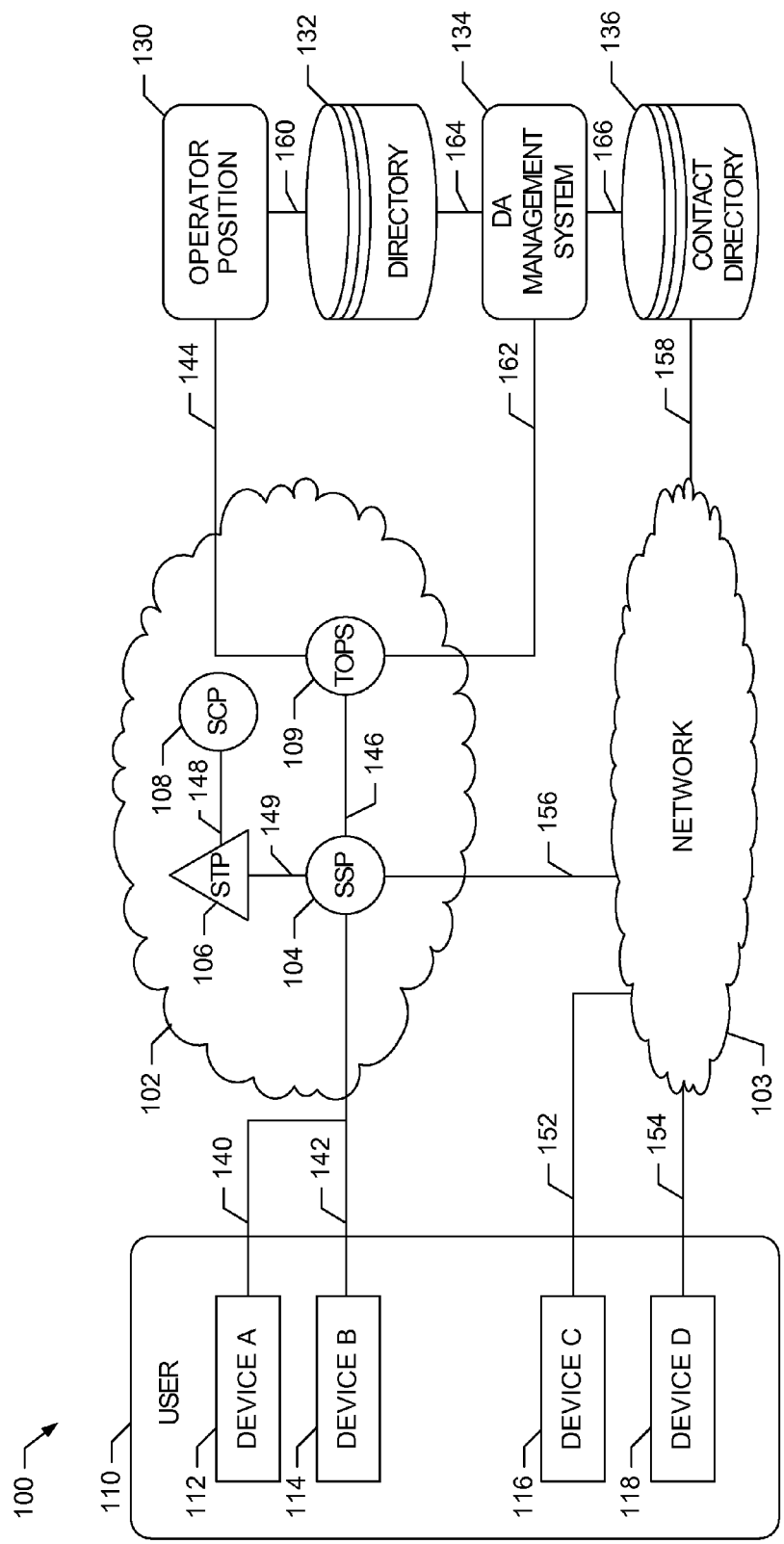
FIG. 1 is a schematic illustration of an example communication system.

An example communication system 100 to provide directory assistance with contact management for users of the example system 100 is illustrated in FIG. 1. The example system 100 of FIG. 1 is useful to provide directory assistance with contact management among diverse user devices (e.g., analog phones, digital phones, voice-over-Internet-Protocol ("VoIP") phones, cellular phones, personal computers, personal digital assistants ("PDAs"), MP3 players, set-top-boxes ("STBs"), etc.). Additionally, the example system 100 of FIG. 1 is useful to provide contact management among many users, each of whom may be associated with one or more user device(s).

The example communication system 100 is configured to provide contact management by storing listing information associated with the use of a directory assistance ("DA") service to a network device (e.g., a database server, a file server, etc.) that can be accessed or transferred among a plurality of user devices. For example, a directory service provider may include an automated system or human operator that responds to a user who places a telephone call. The user may then request a telephone number by providing particular listing information (e.g., city name, state name, business name, surname, etc.) associated with the telephone number. The example automated system or human operator then queries one or more directories or databases to match the provided listing information with a telephone number. When a match is determined, the example automated system or human operator provides the requested telephone number with any other listing information to the user.

As described below, the listing information provided to the user (e.g., a telephone number) and other associated listing information (e.g., mailing address, city name, state, etc.) can be stored as a contact record and associated with the user in a network device (e.g., a database server, a file server, a network address book, etc.). In one example embodiment, the example communication system 100 determines additional listing information with an example reverse lookup function using one or more data objects (e.g., a telephone number) from a billing record generated from the usage of the directory assistance service. In an additional example embodiment, the example communication system 100 is configured to transfer this stored information from the network device to one or more user devices associated with a particular user on an aperiodic basis (e.g., based on event-based procedure(s), etc.) or a periodic basis (e.g., based on scheduled procedure(s), etc.).

Turning to FIG. 1, the example communication system 100 FIG. 1 is shown as a simplified block diagram with components of hardwired and/or wireless communications networks 102 and 103. FIG. 1 also shows the interaction between user devices 112, 114, 116, and 118 associated with a particular user 110, an operator position 130, a directory 132, a directory assistance ("DA") management system 134, and a contact directory 136. The example communication system 100 is illustratively shown with the network 102 configured as an example public switched telephone network, which communicatively couple the user 110 with the operator position 130 through user devices 112 and 114, switches 104 and 109, and communication links 140, 142, and 144. As is well known to those of ordinary skill in the art, the example network 102 may be configured as any network that enables voice and/or data communication among user(s) and a directory assistance service, such as wireless mobile telephone networks, VoIP networks, etc.

The example communication system 100 is also shown with the network 103, which may be implemented as one or more networks (e.g., local-area networks ("LANs"), wide-area networks ("WANs"), metropolitan-area networks, the Internet, digital subscriber line ("DSL") networks, cable networks, power line networks, wireless communication networks, wireless mobile telephone networks, wireless fidelity ("Wi-Fi") networks, and/or satellite networks). The network 103 is shown with data links 158, 156, 154, and 152, which communicatively couple the contact directory 136, SSP 104, and user devices 116 and 118. The data links 152-158 may employ applications, protocols, networks, and/or hardware to communicatively couple each of the user devices 112-118 including, for example, hardwired or wireless communication schemes. For example, the user device 116 may be implemented with a personal computer or set-top-box that communicatively couples with the contact directory 136 and data link 154 via the Internet to exchange data using a common markup language, such as HyperText Markup Language ("HTML"), Extensible Markup Language ("XML"), etc. Additionally or alternatively, the user device 118 may be implemented with a mobile phone that communicatively couples with the contact directory 136 and data link 154 via a Wireless Application Protocol and a Wireless Markup Language.

As shown, each of the communication links 140 and 142 is coupled with a terminating user device 112 and 114, which may include PDAs, cellular telephones, personal computers, television set-top-boxes, and telephone (e.g., an analog telephone, a digital telephone, a VoIP telephone), or any other user device that enables voice and/or data communication over the public switched telephone network 102. Similarly, the additional network 103 is shown coupled with terminating devices 116 and 118, which may include PDAs, cellular telephones, personal computers, television set-top-boxes, and telephone (e.g., an analog telephone, a digital telephone, a VoIP telephone), routers, switches, or any other device that enables voice and/or data communication over the network 103.

In the example communication system 100, each of the example user devices 112-118 has one or more unique device identifiers to distinguish the respective example user devices 112-118 from one another as well as from other user devices, thereby enabling communication between multiple nodes on the network. A device identifier may generally identify a network termination point that connects to one or more user devices (e.g., a telephone number may connect a number of telephones). The device identifier associated with a user device may be a unique alpha-numeric or numeric identifier (e.g., a telephone number, a byte address, an Internet Protocol ("IP") Address, a Mobile Identification Number, etc.). For example, each of the user devices 112 and 114 coupled with the PSTN 102 may be assigned a ten digit number that is associated with a specific telephone line 140 and 142 shown in FIG. 1. To identify one or more user devices (e.g., the user devices 112-118) with a particular user (e.g., the user 110), the device identifiers may be associated with a single record in a data structure. As described below, the record may then be uniquely distinguished and associated with a particular user by a user identifier, such as a user name, a user number, and/or any other unique identifier. Also described below, one or more user devices and device identifiers may be associated with multiple users and, thus, multiple records in a data structure, such as a telephone service and telephone number may be shared with multiple users.

The PSTN 102 incorporates the advanced intelligent network ("AIN"). Some of the components of the advanced intelligent network are shown in FIG. 1 to illustrate at least a part of the advanced intelligent network ("AIN") 102 of a typical local exchange carrier. The advanced intelligent network ("AIN") uses the signaling system 7 ("SS7") network for signal or system control message transport. The components thereof are well known to those skilled in the art. Generally, a plurality of central offices is provided in a typical public switched telephone network 102. As shown in FIG. 1, a central office may include an electronic switch 104 known to those skilled in the art as a service switching point ("SSP"). The number of SSP switches depends on the number of users to be served by the public switched telephone network. An SSP is the AIN component of a typical electronic central office switch used by a local exchange carrier. The terms "SSP" and "switch" are generally used interchangeably and are understood to refer to a telecommunications switch having AIN capability and which may be utilized for connecting communication links or trunk circuits 146.

Much of the intelligence, and the basis for many of the enhanced features of the PSTN 102, resides in the local service control point ("SCP") 108 that is coupled to signal transfer point ("STP") 106 and the SSP 104 via SS7 data links 148 and 149. Among the functions performed by the service control points is maintenance of network databases used in providing enhanced services. Service control points, such as SCP 108, normally implement high volume routing services, such as call forwarding, number translating, and routing. In most local exchange carrier networks, service control points are only used for database look up and routing services that take place prior to the logical completion of the call (i.e., the provision of a ringing signal to the called user and ring back to the calling user).

Directory assistance is a well-known service in public switched telephone network 102, and is generally identified in North America with a telephone number, such as "411" or "555-1212." Directory assistance as discussed herein may also be configured on the networks, as discussed above in connection with network 103 of FIG. 1 in the example communication system 100 of FIG. 1.

To provide directory assistance services, the PSTN 102 of FIG. 1 includes a switch 109 that is coupled with an operator position 130 through the data link 144. The switch 109 is shown as an example Traffic Operator Position System ("TOPS") switch to provide call routing and switching along with directory assistance services. In the PSTN 102, the user 110 may dial a particular telephone number on the user device 112, which is routed via the SSP 104 and the TOPS switch 109 to communicatively couple the user 110 with hardware, software, and/or firmware used by a human operator at the operator position 130. Similarly, the user 110 may be routed to a voice activated system (not shown) configured with hardware, software, and/or firmware to provide directory assistance via text-to-speech ("TTS") or speech recognition systems. An example operator position 130 is discussed in detail below in connection with FIG. 2.

The example communication system 100 also includes directory server(s) 132 that can be queried to obtain listing information via the data links 160 and 162, which communicatively couple the directory server(s) 132 with the operator position 130 and the DA management system 162. The data links 160 and 162 may employ applications, protocols, networks, and/or hardware including, for example, hardwired or wireless Ethernet communication scheme, which is well known and, thus, is not described in greater detail herein. The directory server(s) 132 include one or more data structures including listing information such as telephone numbers, first and last names, business names, business descriptions, email addresses, mailing addresses, etc. The directory server(s) 132 may be implemented using, for example, a look-up table, a relational database, or any other suitable structure for storing data. Similarly, the directory server(s) 132 may comprise removable media disk drives, hard disk drives, network drives, and/or any other suitable storage devices. As discussed above, a human operator or voice activated system at the operator position 130 performs a query on the directory server(s) 132, which may include matching particular listing information such as names (e.g., person and/or business names) and localities (e.g., cities, states, zip codes, etc.).

Also illustratively shown in the example communication system 100 is a directory assistance management system 134 that provides contact management for users of DA services (e.g., the example user 110), administers billing for the usage of DA services, and/or supports any other service to monitor and manage the usage of DA services within the PSTN 102 of FIG. 1. As discussed in detail below in connection with FIG. 3, the directory assistance management system 134 may include servers such as, for example, application servers, database servers, file servers, etc. Additionally, the directory assistance management system 132 may contain a variety of databases such as, for example, mainframe databases, client-server databases, and/or any other electronic store of data supported on any memory device (e.g., removable media disk drives, hard disk drives, network drives). The DA management system 134 is shown coupled with the TOPS switch 109, the directory server(s) 132, and the contact directory 136 via the data links 162, 164, and 166. The data links 162-166 may employ applications, protocols, networks, and/or hardware including, for example, hardwired or wireless Ethernet communication scheme, which is well known and, thus, is not described in greater detail herein.

The example communication system 100 also includes a contact directory 136, which is discussed in detail below in connection with FIG. 5. As discussed below, the contact directory 136 is configured such that the user 110 and the DA management system 134 can obtain existing contact information from and/or provide new contact information to the contact directory 136. The contact directory 136 includes one or more data structures including contact records for a particular user, which may contain information such as telephone numbers, first and last names, business names, business descriptions, email addresses, mailing addresses, and/or navigational coordinates. Additionally, the contact directory 136 may contain other individually customizable fields that can be configured to store electronic information relating to a particular person and/or business. The contact directory 136 may be implemented using, for example, a look-up table, a relational database, or any other suitable structure for storing data. Similarly, the contact directory 136 may comprise removable media disk drives, hard disk drives, network drives, and/or any other suitable storage devices. As previously discussed, the contact directory 136 is coupled with the network 103 and the DA management system 134 via the data links 158 and 166.

Figure 2:
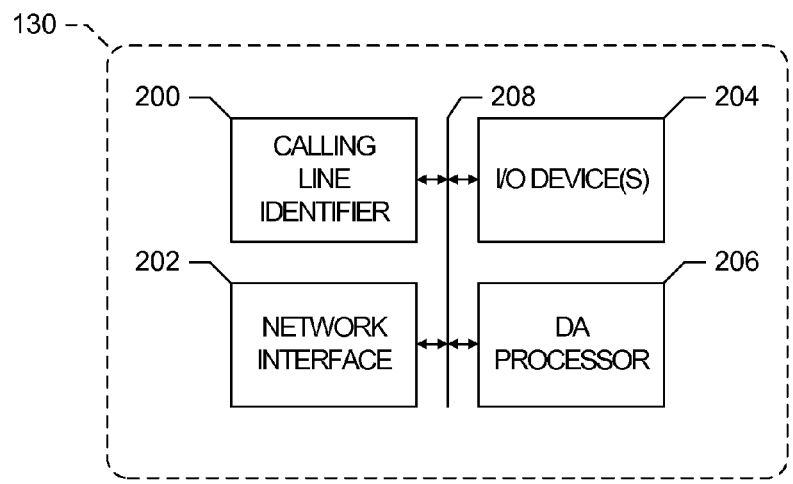
FIG. 2 is a schematic illustration of an operator position of FIG. 1.

FIG. 2 depicts an example operator position 130 of FIG. 1 that is configured to provide DA services in the example communication system 100 of FIG. 1. More particularly, the example operator position 130 of FIG. 2 includes a network interface device 202 that may include hardware and/or software such as, for example, a data link layer of a wired Ethernet or any other suitable physical connection to communicatively couple the data links 144 and 160; a calling line identifier 200 to determine a particular device identifier associated with the user devices 112 and 114 and/or the communication links 140 and 142 of FIG. 1 (e.g., a telephone number for the user devices 112 and communication link 140 of FIG. 1); a DA processor 206 to generate a directory assistance service record that contains one or more data objects to register a DA service transaction (e.g., a telephone number of a user to be billed and a telephone number of a matched listing); and one or more input/output device(s) 204 to enable a human operator interaction with the operator position 130 of FIG. 2 (e.g., a keyboard, a mouse, a graphical monitor, a microphone, a speaker or headset, etc.). Also, the operator position 130 of FIG. 2 includes a system interface 208 that may employ common applications and/or hardware to communicatively couple the caller identifier 200, network interface 202, I/O devices 204, and DA processor 206. The operation of the example operator position 130 of FIG. 2 is discussed below in connection with FIG. 6.

Figure 3:
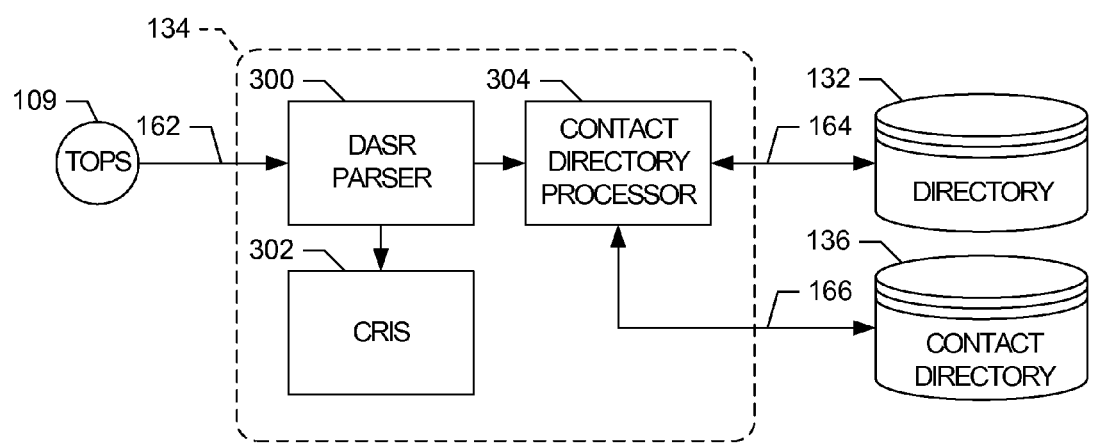
FIG. 3 is a schematic illustration of an example directory assistance ("DA") management system of FIG. 1.

FIG. 3 depicts an example DA management system 132 of FIG. 1 configured to provide contact management for users of DA services (e.g., the example user 110), administer billing for the usage of DA services, and/or support any other service to monitor and manage the usage of DA services within the PSTN 102 of FIG. 1. The DA management system 132 of FIG. 2 includes a directory assistance service record ("DASR") parser 300 that obtains a directory assistance service record from the TOPS switch 106 of FIG. 1 and replicates the data objects from the directory service record for processing in the DA management system 132 of FIG. 2; a customer records information system ("CRIS") 302 to administer the billing for DA service usage and any other billing services associated with the PSTN 102 of FIG. 1; and a contact directory processor 304 provide one or more interface(s) to read data from the directory 132 of FIG. 1 and to read and write data to the contact directory 166 of FIG. 1. The operation of the DA management system 132 of FIG. 2 is discussed below in connection with FIG. 6.

FIG. 4 depicts an example directory data structure 400 that associates listing information in the example directory server(s) 132 of FIG. 1. The example directory data structure 400 includes listing information fields 402-414, which contain listing information to define the respective listing records 420-424. In particular, the first name field 402 contains "JOHN," the last name field 404 contains "DOE," the mailing address field 406 contains "123 FIRST ST", the city field 408 contains "FRANKLIN," the state field 410 contains "TX," the zip code field 412 contains "77856," and the telephone number field 414 contains "979-555-1000" to define the listing record 420. Additionally or alternatively, the listing information associated with a listing record in the example directory data structure 400 may include email addresses, business names, business descriptions, navigational coordinates, etc. (not shown). Also, persons of ordinary skill in the art will understand that such textual descriptions can alternatively or additionally be implemented by codes and/or other designations.

FIG. 5 depicts an example contact directory data structure 500 that interrelates listing information to one or more contact records associated with a particular user of the example communication system 100 of FIG. 1 (e.g., example user 110 of FIG. 1), which may be located in the example contact directory 136 of FIG. 1. The example contact directory data structure 500 may be implemented as a network electronic address book, which can communicatively couple with one or more clients (e.g., the user devices 112-118) to transfer or synchronize one or more contact records. The example contact directory data structure 500 contains a user table 502 to store data objects that define a particular user including a user name field 510 to uniquely identify the user, an account identifier field 512 to associate any number of accounts or device identifiers with the user, and a password field 513 to allow unique access to the contact directory 136. Also, the example contact directory data structure 500 includes a contact table 511 to store data objects in the respective fields 514-528, which associates listing information into a contact record that relates with a particular user defined in the user table 502.

For example, the user table 502 contains an example record 504 associated with the example user 110 of FIG. 1 that includes "USER110" in the user name field 510, "555-555-1000" (e.g., the phone number associated with the phone 112) in the account identifier field 512, and "USER110PASSWORD" in the password field 513. The contact table 511 is shown with an example contact record 506 associated with the example user 110 of FIG. 1 that includes "USER110A" in the contact identifier field 514, "JEAN" in the first name field 516, "DOE" in the last name field 518, "123 FOURTH ST" in the mailing address field 520, "MADISON" in the city field 522, "FL" in the state field 524, "32340" in the zip code field 526, and "850-555-1000" in the telephone number field 528. Persons of ordinary skill in the art will understand that such textual descriptions can also be implemented by codes and/or other designations. The contact table 511 is also shown with an unpopulated contact record 508, which is discussed in detail below. Additionally or alternatively, the listing information associated with a contact record in the example contact directory data structure 500 may include multiple telephone numbers, email addresses, business names, business descriptions, navigational coordinates, or other individually customizable fields (not shown). As explained below, a user (e.g., user 110 of FIG. 1) associated with a particular contact record (e.g., the contact records 506 and 508 of FIG. 5) can write additional information to the example contact directory data structure 500, which may not be available as listing information (e.g., private contact information).

Figure 6:
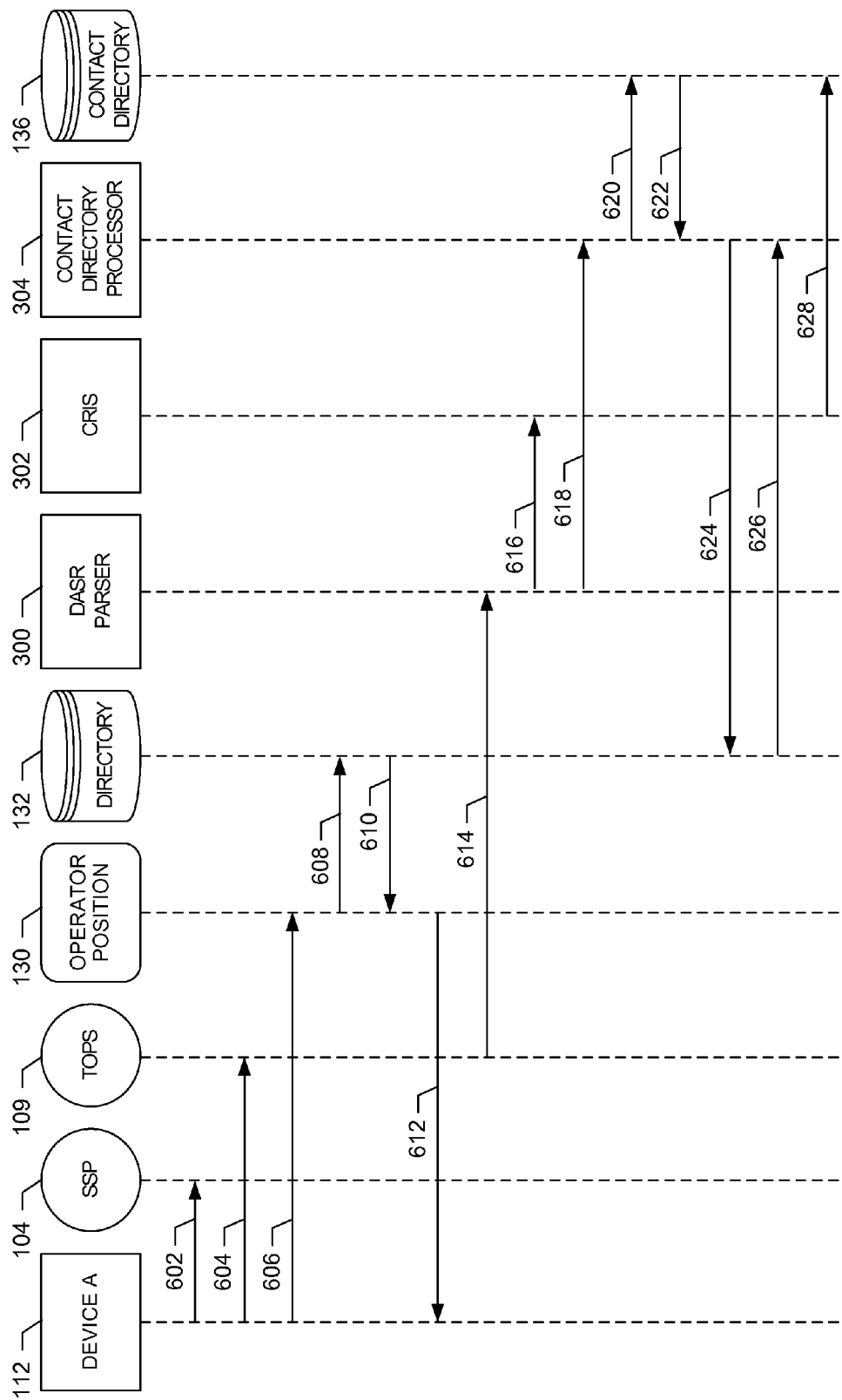
FIG. 6 is an example sequence diagram of the example communication system of FIG. 1.

FIG. 6 depicts an example sequence diagram illustrating the functionality of the communication system 100 of FIG. 1 providing directory assistance with contact management. The example system process of FIG. 6 begins with the user 110 of FIG. 1 dialing a particular number with the user device 112 of FIG. 1 to the SSP 104 of FIG. 1 (e.g., the user 110 of FIG. 1 dials "411" into telephone 112 of FIG. 1) (step 602). The SSP 104 of FIG. 1 then routes the communication of the user device 112 of FIG. 1 to the TOPS switch 109 of FIG. 1 (step 604), which communicatively couples the user 110 of FIG. 1 with the example operator position 130 of FIG. 1 (step 606). Once the example operator position 130 of FIG. 1 is communicatively coupled with the user 110 of FIG. 1, the calling line identifier 200 of FIG. 2 identifies the device identifier associated with the user device 112 of FIG. 1 or other such unique identifiers associated with the user 110 of FIG. 1. The example user 110 of FIG. 1 communicates to a human operator at the operator position 130 of FIG. 1 particular listing information, such as locality information (e.g., a city name, a state name, a zip code, etc.) and/or other such listing information (e.g., a business name, a surname, a first and last name, etc.). For example, the user 110 of FIG. 1 may communicate to the operator a last name of "DOE" and a zip code of "04441." The operator may then enter the provided listing information to one or more string objects (i.e., one or more particular sequences of symbols, digits, and/or other characters) using one or more of the I/O device(s) 204 of FIG. 2 (e.g., a mouse, a keyboard, a microphone, etc.) into the DA processor 206 of FIG. 2. The DA processor 206 of FIG. 2 may provide respective fields for each string to relate to a particular listing field in the directory server(s) 132 of FIG. 1 (e.g., a one-to-one correlation with the first name field 402, the last name field, the mailing address field 406, the city field 408, the state field 410, the zip code field 412, and the telephone number field 414 of FIG. 4).

Thus, the DA processor 206 of FIG. 2 queries the directory server(s) 132 of FIG. 1 to determine respective matches with the entered string objects via, for example, an application programming interface ("API") that enables queries and/or data exchanges between the DA processor 206 of FIG. 2 and the directory server(s) 132 of FIG. 1 (step 608). The query of the directory server 132 of FIG. 1 may be implemented as a lookup function, which is generally associated with directories to enable a query of a known a name and/or locality of a person or business to whom a telephone number is registered, which then retrieves the telephone number. The directory server(s) 132 of FIG. 1 analyzes, for example, the listing records 420-424 and, in this instance, the respective last name fields 404 and zip code fields 412 to determine matching listing information. In this example, a match for the listing record 424 is determined from the matching last name of "DOE" and zip code of "04441" in the respective fields 404 and 412. Thus, the directory server(s) 132 of FIG. 1 returns some or all of the listing information from fields 402-414 associated with listing record 424 (e.g., first name of "JACK", mailing address of "123 THIRD ST", city name of "GREENVILLE", state name of "ME", and/or telephone number of "207-555-1000") to the DA processor 206 of FIG. 2 (step 610). Although this example provides an exact match of listing information, the directory server(s) 132 of FIG. 1 may provide sequential string matching algorithms as near matching (e.g., matching a number of characters or sequence of characters within a string) and index matching (e.g., ranking a subset of characters or sequence of characters within a string), or any such current or future string matching algorithms.

The DA processor 206 of FIG. 2 then sends the returned listing information to one or more of the I/O devices 204 to audibly, textually, or visually communicate the listing information for the human operator and/or the user (step 612). For example, the human operator may communicate the matched listing information (e.g., the telephone number of "207-555-1000") to the user 110 of FIG. 1 and/or offer to directly connect the user 110 of FIG. 1. The operator may also perform several additional queries with new or modified listing information communicated from the user. When the example communication between the user 110 of FIG. 1 and the operator position 130 of FIG. 2 completes, the DA processor 206 of FIG. 2 creates a directory assistance service record to register the usage of the DA service by the example user 110 of FIG. 1. In particular, the DA processor 206 of FIG. 2 generates a directory assistance service record to register, for example, the telephone number of "555-555-1000" associated with the user device 112 of FIG. 1 and the telephone number of "207-555-1000" from the matching listing record 424 of FIG. 4. Persons of ordinary skill in the art will readily understand that the directory assistance service record may include textual or other data objects to register the use of directory assistance. Also, the directory assistance service records may include any syntactical language capable of describing and structuring data objects such as, for example, extensible markup language ("XML"), HyperText Markup Language ("HTML"), character delimited string, etc.

The DA processor 206 of FIG. 2 sends the directory assistance service record from the example operator position 130 of FIG. 1 via the TOPS switch 106 of FIG. 1 to the example DA management system 134 of FIG. 1 and, more particularly, the DASR parser 300 of FIG. 3 (step 614). The DASR parser 300 of FIG. 3 then duplicates the information from the directory assistance service record to simultaneously execute multiple tasks. For example, the DASR parser 300 of FIG. 3 passes one or more data objects from the directory assistance service record to the CRIS 302 of FIG. 3 to update a particular user account in a financial accounting system (e.g., debit the accrued expense account associated with user 110 of FIG. 1 to reflect the usage of directory assistance) (step 616). The DASR parser 300 of FIG. 3 also passes one or more data objects from the directory assistance service record (e.g., the telephone number of "555-555-1000" associated with the telephone 112 of FIG. 1) to the contact directory processor 304 of FIG. 3 (step 618).

The contact directory processor 304 of FIG. 3 then queries the contact directory 136 of FIG. 1 to determine if user 110 of FIG. 1 has an associated user record in the contact directory 136 of FIG. 1 (step 620). For example, the contact directory processor 304 of FIG. 3 sends the string of "555-555-1000" to the contact directory 136 of FIG. 1, which analyzes the user records and, in particular, the account identifier field 512 to determine a match for a record associated with the example user 110 of FIG. 1. In this example, a match for the user record 504 is determined, which identifies one or more records associated with user 110 of FIG. 1 (e.g., the contact records 506 and 508 of FIG. 5). The contact directory 136 of FIG. 1 then returns a logic value or other such signifier to the contact directory processor 304 of FIG. 3 to identify an associated user record, for example, the username "USER110" or the contact identifier "USER110B" for the user 110 of FIG. 1 (step 622). Alternatively, the contact directory may return a Boolean value such as, for example, a false signifier (e.g., "0") for no determined match or a true signifier (e.g., "1") for a determined match.

Although this example provides an exact match of the account identifier field 512, the contact directory 136 of FIG. 1 may provide sequential string matching algorithms as near matching (e.g., matching a number of characters or sequence of characters within a string) and index matching (e.g., ranking a subset of characters or sequence of characters within a string), or any such current or future string matching algorithms. Also, the contact directory processor 304 of FIG. 3 may query the contact directory 136 of FIG. 1 with any syntactical language capable of describing and structuring data objects from a directory assistance service record such as, for example, extensible markup language ("XML"), HyperText Markup Language ("HTML"), or any other such markup language or character delimited string.

The contact directory processor 304 of FIG. 3 also uses one or more data objects from the directory assistance service record (e.g., the telephone number of "207-555-1000" associated with the matching listing record 424 of FIG. 4) to query the directory server(s) 132 of FIG. 1 (step 624). The query of the contact directory processor 304 of FIG. 3 may be implemented as a reverse lookup function, which is generally associated with directories to enable a query with a known telephone number, which then retrieves a name and/or address of a person or business to whom the telephone number is registered. The directory server(s) 132 of FIG. 1 analyze, for example, the listing records 420-424 and, in this instance, the telephone number field 414 of FIG. 4 to determine matching listing information. In this example, a match for the listing record 424 is determined from the string of "207-555-1000" in the telephone number field 414. Thus, the directory server(s) 132 of FIG. 1 returns some or all of the listing information from fields 402-414 associated with listing record 424 (e.g., first name of "JACK", last name of "DOE", mailing address of "123 THIRD ST", city name of "GREENVILLE", state name of "ME", zip code of "04441" and/or telephone number of "207-555-1000") to the contact directory processor 304 of FIG. 3 (step 626). As the telephone number originated from the directory server(s) 132 of FIG. 1 and, more particularly, the directory data structure 400 of FIG. 4, the contact directory processor 304 of FIG. 3 is provided a relative certainty for determining matching listing information using the example reverse look-up function described above.

With the additional listing information returned from the query and the identification of user record 504 of FIG. 5 in the contact directory 136 of FIG. 1, the contact directory process 304 of FIG. 3 stores the returned listing information as contact record 508 in the contact directory 136 of FIG. 1 (step 628). In particular, the contact directory processor 304 of FIG. 3 stores the returned listing information associated with listing record 424 of FIG. 4 (e.g., "JACK" from the first name field 402, "DOE" from the last name field 404, "123 THIRD ST" from the mailing address field 406, "GREENVILLE" from the city field 408, "ME" from the state field 410, "04441" from the zip code field 412, "207-555-1000" from the telephone number field 414 of FIG. 4) to the respective fields 516-528 in contact record 508 of FIG. 5. Thus, listing information provided from directory service usage and additional listing information associated with the listing record is stored as a contact record and associated with the example user 110 of FIG. 1 in the contact directory 136 of FIG. 1. The contact directory processor 304 may also be configured to identify a contact record as a contact stemming from a DA service request, for example, the contact table 510 of FIG. 5 may only store contacts records associated with DA service requests and/or an additional field in contact table 510 may be populated with "DA contact" (not shown).

As previously stated, the example communication system 100 of FIG. 1 may be configured to transfer the content of the contact directory 136 of FIG. 1 to an associated user device prior to and/or after a user request. For example, the user device 112 of FIG. 1 may be a VoIP telephone, which may on an aperiodic basis (e.g., based on event-based procedure(s), etc.), a periodic basis (e.g., based on scheduled procedure(s), etc.), or real-time basis to obtain or receive updated contacts from the contact directory 136 of FIG. 1. Similarly, the contact directory 136 of FIG. 1 may be implemented with API(s) to enable users to communicatively couple and interact with the contact directory 136 of FIG. 1. Example of such interfaces may include providing graphic user interfaces via a browser or other such common programs to enable user interaction on user devices, such as, for example, VoIP phones, cellular phones, personal computers, personal digital assistants, MP3 players, set-top-boxes, or any other device which may audibly or visually communicate data objects to a user.

Such an interface may provides a user (e.g., users 110 of FIG. 1) to access designated contact directory data structures within the example contact directory 136 of FIG. 1 through one or more user devices (e.g., the user devices 112-116). The interface may use, for example, a web-based or HTML user interface to accept input and provide output by generating web pages that are transported via the Internet and viewed by the user using a web browser program, a telephone user interface to accept input (e.g., a tone-dialed response) and provide output by generating telephone voice that is transported via a telephone network and heard by the user using a telephone, or any other hardware, software, or firmware that enables the user devices 112-118 of FIG. 1 to enable inputs that allow a user to control the contact directory 136 of FIG. 1 and outputs that allow the contact directory 136 of FIG. 1 to produce the effects of the control. To this end, the interface also may include one or more example authentication mechanisms and/or protocols to authenticate a particular user seeking to access the example contact directory 136 of FIG. 1. Example mechanism(s) and/or protocol(s) that can be employed may include requiring entry of a unique identifier (e.g., the user name "USER110" of the user name field 510 of FIG. 5) and password (e.g., the password "USER110PASSWORD" of the password field 513 of FIG. 5) associated with a particular data structure (e.g., the contact data structure 500 of FIG. 5), and/or using a user device (e.g., the user device 112 of FIG. 1) having a device identifier uniquely associated with a field in data structure (e.g., the account identifier field 512 of FIG. 5). After authenticating a user, the interface enables the authenticated user to provide, delete, and/or change one or more fields and/or records in the contact directory 136 of FIG. 1 via the example user devices 112-118 or other user devices, as discussed above in the example communications system 100 of FIG. 1.

Figure 7:
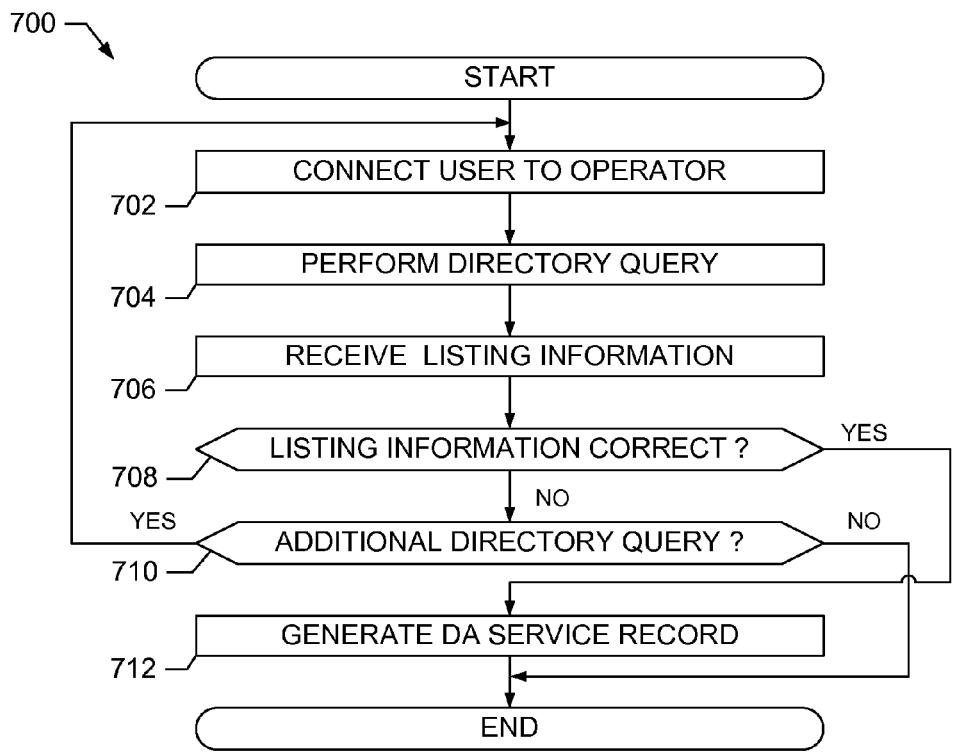
FIG. 7 is a flow chart representation of example process that may be executed to implement the operator position of FIG. 1.
Figure 8:
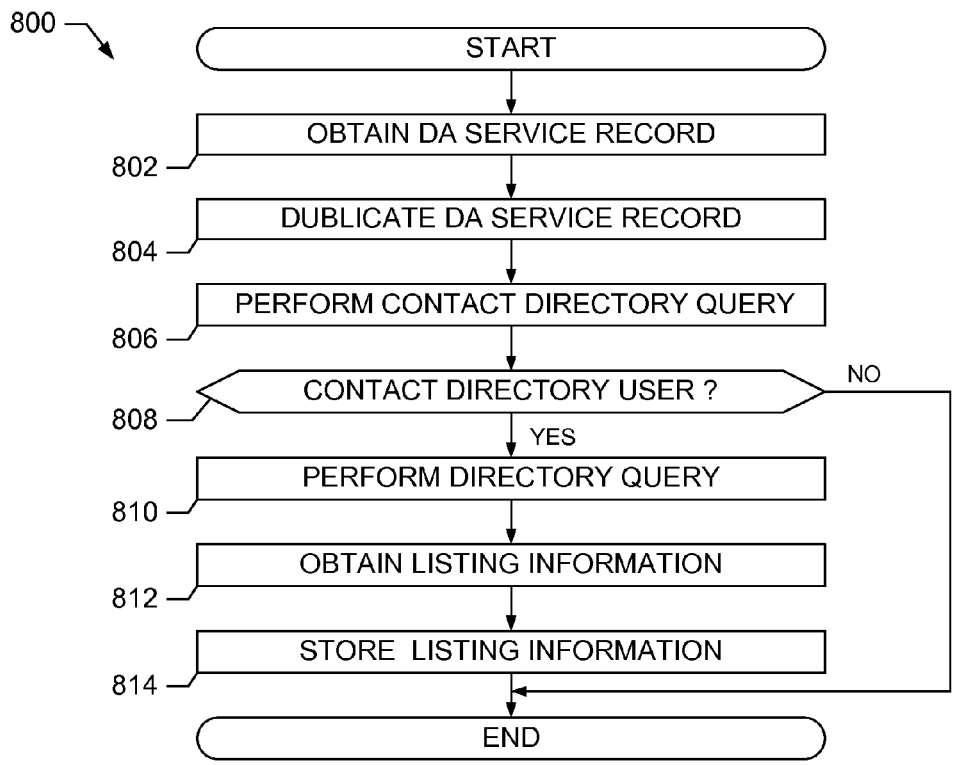
FIG. 8 is a flow chart representation of example process that may be executed to implement the DA management system of FIG. 1.

Flow diagrams representative of example processes configured to implement the example operator position 130 of FIG. 1 and the DA management system 134 of FIG. 1 are shown in FIGS. 7 and 8. In these examples, the processes may be implemented as machine readable instructions in the form of one or more example programs for execution by a processor, such as the processor 805 shown in the example processor system 900 of FIG. 9. The processes may be embodied in software stored on a tangible medium such as a CD-ROM, a floppy disk, a hard drive, a digital versatile disk ("DVD"), or a memory associated with the processor 905, but persons of ordinary skill in the art will readily appreciate that the entire processes and/or parts thereof could alternatively be executed by a device other than the processor 905 and/or embodied in firmware or dedicated hardware in a well known manner. For example, any or all of the example operator position 130 of FIG. 1, the DA management system 134 of FIG. 1, the directory server(s) 132 of FIG. 1, and the contact directory 136 of FIG. 1 could be implemented by firmware, hardware, and/or software. More particularly, the calling line identifier 200, network interface 202, I/O devices 204, and DA processor 206 of the example operator position 130 of FIG. 2 along with the DASR parser 300, CRIS 302, and contact directory processor 304 of the example DA management system 134 of FIG. 3 may be implemented by firmware, hardware, and/or software. Further, although the example processes are described with reference to the flow diagrams illustrated in FIGS. 7-8, persons of ordinary skill in the art will readily appreciate that many other methods of implementing the example processes may alternatively be used. For example, the order of execution of the blocks may be changed, and/or some of the blocks described may be changed, eliminated, or combined. Similarly, the execution of the example processes and each block in the example processes can be performed iteratively.

The example process 700 of FIG. 7 provides an example execution sequence that may be performed by the example operator position 130 of FIG. 1 to provide DA service for a user (e.g., the example user 110 of FIG. 1) and record the use of the DA service by the user. The example process 800 of FIG. 8 provides an example execution sequence that may be performed by the example DA management system 134 of FIG. 1 to provide contact management for a user of DA services (e.g., the example user 110), administer billing for the usage of DA services, and/or any other electronic services to monitor the usage of DA services.

The example process 700 of FIG. 7 begins at block 702 where the example operator position 130 of FIG. 1 communicatively couples a user, who may dial a particular telephone number (e.g., "411," "555-1212," etc.) with an operator, which provides the example operator position 130 of FIG. 1 with the device identifier associated with the user device. After the user and the operator are communicatively coupled (block 702), the example operator position 130 of FIG. 1 receives particular listing information (e.g., city name(s), state name(s), zip code(s), business name(s), surname(s), first and last name(s), etc.) from the user. The operator position 130 of FIG. 1 then queries the directory server(s) 132 of FIG. 1 with the user-provided listing information, which may employ any such sequential string matching algorithms such as near matching (e.g., matching a number of characters or sequence of characters within a string), index matching (e.g., ranking a subset of characters or sequence of characters within a string), or any such current or future string matching algorithms.

The operator position 130 of FIG. 1 then receives the results of the query from the directory server(s) 132 of FIG. 1 (block 706) and provides the listing information to the user (block 706). If the operator position 130 of FIG. 1 receives a communication that the provided listing information is incorrect (e.g., a negative verbal response from a user, a particular tone-dialed response from a user device, etc.), the operator position 130 of FIG. 1 provides the user an option for an additional directory query (block 710). If the operator position 130 of FIG. 1 receives a communication to indicate an additional directory query (e.g., an affirmative verbal response from a user, a particular tone-dialed response from a user device, etc.), the operator position 130 of FIG. 1 repeats blocks 702-708 to perform an additional query with new or additional listing information received from the user.

If the operator position 130 of FIG. 1 receives a communication that the provided listing information is correct (e.g., an affirmative verbal response, a particular tone-dialed response from a user device, etc.), the operator position 130 of FIG. 1 generates a directory assistance service record to register the usage of the DA service by the user (block 712), which is sent to the DA management system 134 of FIG. 1. The directory assistance service record may include one or more data objects such as, for example, a telephone number for the user to be billed and a telephone number of the provided listing information. After a directory assistance service record is generated and sent (block 712) or the operator position 130 of FIG. 1 receives a request from the user for no additional directory queries (e.g., an affirmative verbal response from a user, a particular tone-dialed response from a user device, etc.) (block 710), the process 700 ends and/or returns control to a higher-level process.

The example process 800 of FIG. 8 begins at block 802 where the DA management system 134 of FIG. 1 obtains a directory assistance service record, which may be generated from the example operator position 130 of FIG. 1. After obtaining the directory assistance service record (block 802), the DA management system 134 of FIG. 1 duplicates one or more data objects from the directory assistance service record to any additional processes for parallel processing. For example, the DA management system 134 of FIG. 1 may duplicate the directory assistance service record to a billing process. After duplicating one or more data objects from the directory assistance service record to create any parallel processes (block 804), the DA management system 134 of FIG. 1 performs a query on the contact directory 136 of FIG. 1 to determine if one or more users specified by the data objects from the directory assistance service record has a record in the contact directory 136 of FIG. 1 (block 806). For example, the DA management system 134 of FIG. 1 may query the contact directory 136 of FIG. 1 for a record containing a particular telephone number or other such unique user identifier associated with a user from the directory assistance service record. The DA management system 134 of FIG. 1 may also query the contact directory 136 of FIG. 1 and identify a plurality of records associated with a particular telephone number or other such unique identifier from the data object(s) of the directory assistance service record.

If the DA management system 134 of FIG. 1 does not identify a record associated with the user from the directory assistance service record in block 808, the DA management system 134 of FIG. 1 ends the process 800 and/or returns control to a higher-level process. Alternatively, if the DA management system 134 of FIG. 1 identifies a record associated with the user from the directory assistance service record in block 808, the DA management system 134 of FIG. 1 performs a query of the directory server(s) 132 of FIG. 1 with one or more data objects from the directory assistance service record (block 810). For example, the DA management system 134 of FIG. 1 may query the directory server(s) 132 of FIG. 1 with a telephone number from the directory assistance service record.

The DA management system 134 of FIG. 1 then obtains some or all of the listing information associated with the listing record returned from the directory server(s) 132 of FIG. 1 (block 812). For example, the DA management system 134 of FIG. 1 may obtain first names, last names, mailing addresses, city names, state names, zip codes, multiple telephone numbers, email addresses, business names, business descriptions, navigational coordinates, or any other listing information that can be stored in the directory server(s) 132 of FIG. 1. After the listing information is obtained in block 812, the DA management system 134 stores the listing information as one or more contact records in the contact directory 136 of FIG. 1 (block 814). For example, the DA management system 134 may store the listing information to a contact record that is associated with the user of directory assistance. The DA management system 134 may also store the listing information to a plurality of contact records, each of which is associated with a different user record in the contact directory 136 of FIG. 1 (e.g., multiple user records associated with a common data object, such as multiple users associated with a telephone number). The DA management system 134 also may store the new contact record in a particular table specified for DA service contacts or populate a particular field to differentiate the new contact record as contact associated with DA service usage.

Figure 9:
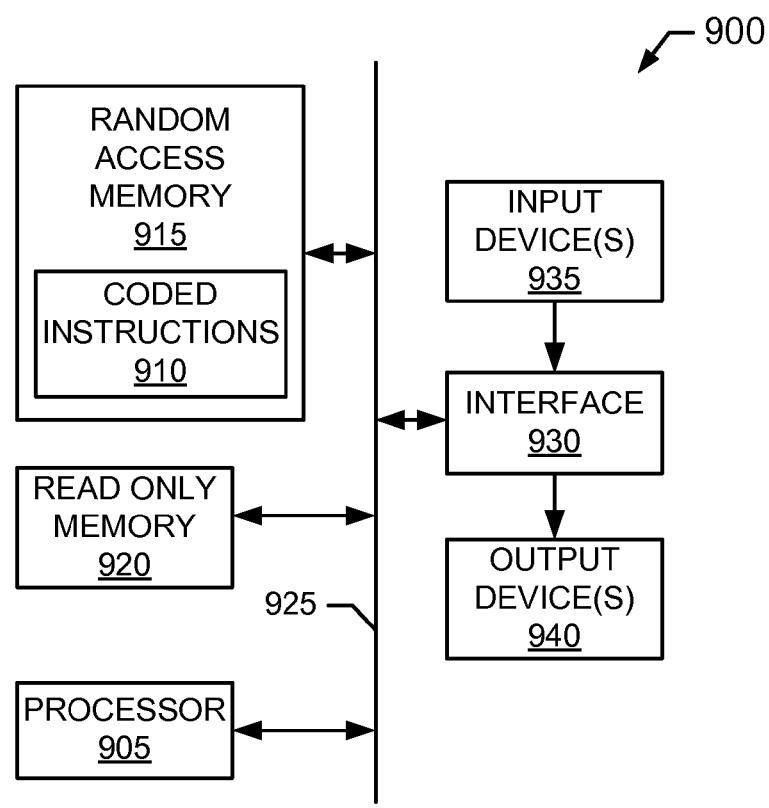
FIG. 9 is a schematic illustration of an example processing system that may be used to execute the example processes of FIGS. 7 and 8 and/or to implement the example operator position and DA management system of FIG. 1.

FIG. 9 is a schematic diagram of an example processor platform 900 that may be used and/or programmed to implement any or all of the example operator position 130 of FIG. 1, the DA management system 134 of FIG. 1, the directory server(s) 132 of FIG. 1, and the contact directory 136 of FIG. 1. More particularly, any or all of the calling line identifier 200, network interface 202, I/O devices 204, and DA processor 206 of the example operator position 130 of FIG. 2 along with the DASR parser 300, CRIS 302, and contact directory processor 304 of the example DA management system 134 of FIG. 3 may be implemented by the example processor platform 900. For example, the processor platform 900 can be implemented by one or more general purpose single-thread and/or multi-threaded processors, cores, microcontrollers, etc. The processor platform 900 may also be implemented by one or more computing devices that contain any of a variety of concurrently-executing single-thread and/or multi-threaded processors, cores, microcontrollers, etc.

The processor platform 900 of the example of FIG. 9 includes at least one general purpose programmable processor 905. The processor 905 executes coded instructions 910 present in main memory of the processor 905 (e.g., within a random-access memory ("RAM") 915). The coded instructions 910 may be used to implement the instructions represented by the example processes of FIGS. 7 and 8. The processor 905 may be any type of processing unit, such as a processor core, processor and/or microcontroller. The processor 905 is in communication with the main memory (including a read-only memory ("ROM") 920 and the RAM 915) via a bus 925. The RAM 915 may be implemented by dynamic RAM ("DRAM"), Synchronous DRAM ("SDRAM"), and/or any other type of RAM device, and ROM may be implemented by flash memory and/or any other desired type of memory device. Access to the memory 915 and 920 may be controlled by a memory controller (not shown).

The processor platform 900 also includes an interface circuit 930. The interface circuit 930 may be implemented by any type of interface standard, such as an external memory interface, serial port, general purpose input/output, etc. One or more input devices 935 and one or more output devices 940 are connected to the interface circuit 930.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol ("TCP")/Internet Protocol ("IP"), User Datagram Protocol ("UDP")/IP, HyperText Markup Language ("HTML"), HyperText Transfer Protocol ("HTTP")) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

This patent contemplate examples wherein a device is associated with one or more machine readable mediums containing instructions, or receives and executes instructions from a propagated signal so that, for example, when connected to a network environment, the device can send or receive voice, video or data, and communicate over the network using the instructions. Such a device can be implemented by any electronic device that provides voice, video and/or data communication, such as a telephone, a cordless telephone, a mobile telephone, a cellular telephone, a Personal Digital Assistant ("PDA"), a set-top box, a computer, and/or a server.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising: obtaining, via a processor, a billing record generated to track usage of a directory assistance service by a caller, wherein the billing record comprises a first data object conveyed to the caller in association with the usage of the directory assistance service and a second data object associated with the caller; querying, via a processor, a first directory with the first data object of the billing record to obtain listing information associated with the first data object; and storing the obtained listing information in a second directory as a contact record associated with the second data object.

2. The method of claim 1, further comprising querying the second directory with the second data object to identify user records associated with the second data object.

3. The method of claim 2, wherein storing the obtained listing information in the second directory comprises relating each the contact record with the identified user records.

4. The method of claim 1, wherein querying the first directory with the first data object comprises querying the first directory with a telephone number provided to the caller during the usage of the directory assistance service.

5. The method of claim 1, wherein the usage of the directory assistance service is via a telephone call.

6. The method of claim 1, wherein the listing information comprises a telephone number.

7. The method of claim 1, wherein the first data object comprises a telephone number.

8. The method of claim 1, wherein the second directory comprises a networked computing platform communicatively coupled with a computer.

9. The method of claim 1, further comprising transferring contact record to a user device.

10. The method of claim 9, wherein the user device comprises a cellular telephone.

11. The method of claim 9, wherein transferring the contact record comprises transferring the contact record to the user device prior to a user request.

12. A tangible machine readable storage device comprising instructions which, when executed, cause a machine to perform a method comprising: obtaining a billing record generated to track usage of a directory assistance service by a caller, wherein the billing record comprises a first data object conveyed to the caller in association with the usage of the directory assistance service and a second data object associated with the caller; querying a first directory with the information of the first data object of the billing record to obtain listing information associated with the first data object; and storing the obtained listing information in a second directory as a contact record associated with the second data object.

13. The storage device as defined in claim 12, wherein the method further comprises querying the second directory with the second data object and identifying a user record associated with the second data object.

14. The storage device as defined in claim 13, wherein storing the obtained listing information in the second directory comprises relating the contact record with the identified user record.

15. The storage device as defined in claim 12, wherein querying the first directory with the first data object comprises querying the first directory with a telephone number provided to the caller during the usage of the directory assistance service.

16. The storage device as defined in claim 12, wherein the listing information comprises a telephone number.

17. The storage device as defined in claim 12, wherein the first data object comprises a telephone number.

18. The storage device as defined in claim 12, wherein the second directory comprises a networked computing platform communicatively coupled with a computer.

19. The storage device as defined in claim 12, wherein the method further comprises transferring the contact record to a user device.

20. The storage device as defined in claim 19, wherein the user device comprises an electronic mail server.

21. The storage device as defined in claim 19, wherein transferring the contact record comprises transferring the contact record to the user device prior to a user request.

22. An apparatus comprising:
a memory having machine readable instructions stored thereon;
a processor to execute the instructions to perform operations comprising:
obtaining a billing record generated to track usage of a directory assistance service by a caller, wherein the billing record comprises a first data object conveyed to the caller in connection with the usage of the directory assistance service and a second data object associated with the caller;

querying a first directory based on the first data object of the billing record;

obtaining listing information associated with the first data object; and storing the obtained listing information as a contact record in a contact directory in association with the second data object.

23. The apparatus of claim 22, wherein the operations further comprise querying the contact directory with the second data object and identifying a user record associated with the second data object.

24. The apparatus of claim 22, wherein the listing information comprises a mailing address.

25. The apparatus of claim 22, wherein the first data object comprises an instant messaging address.

26. The apparatus of claim 22, wherein the contact directory is communicatively coupled with a voice over Internet Protocol telephone.

27. The apparatus of claim 26, wherein the contact directory is to transfer the contact record to the voice over Internet Protocol telephone.

28. The apparatus of claim 27, wherein the contact directory is to transfer the contact record prior to a user request.

29. The method of claim 1, wherein the first data object corresponds to a telephone number requested by the caller during the usage of the directory assistance service, and wherein querying the first directory with the first data object comprises performing a reverse lookup function using the telephone number to obtain the listing information associated with the first data object.

30. The storage device as defined in claim 12, wherein the first data object corresponds to a telephone number requested by the caller during the usage of the directory assistance service, and wherein querying the first directory with the first data object comprises performing a reverse lookup function using the telephone number to obtain the listing information associated with the first data object.

31. The apparatus as defined in claim 22, wherein the first data object corresponds to a telephone number requested by the caller during the usage of the directory assistance service, and wherein querying the first directory with the first data object comprises performing a reverse lookup function using the telephone number to obtain the listing information associated with the first data object.

* * * * *